3,644,427
SYNTHESIS OF 3-HALOALKYL HYDROCARBON-
CARBOXYLATES AND 4-HALOTETRAHYDRO-
PYRANS
Paul R. Stapp, Bartlesville, Okla., assignor to
Phillips Petroleum Company
No Drawing. Filed Feb. 13, 1970, Ser. No. 11,311
Int. Cl. C07d 7/04; C07c 69/00
U.S. Cl. 260—345.1                                       9 Claims

ABSTRACT OF THE DISCLOSURE

A 3-haloalkyl hydrocarboncarboxylate and a 4-halotetrahydropyran are produced by reacting a 1-alkene, $(HCHO)_n$, a hydrogen halide and an acid halide at a temperature in the range of −80 to −30° C., wherein $n$ is the integer 1 or greater.

This invention relates to a process for the production of a 3-haloalkyl hydrocarboncarboxylate and a 4-halotetrahydropyran.

The reaction of paraformaldehyde, hydrogen chloride and propylene at room temperature to produce 3-chloro-1-butanol is disclosed in Chemical Abstracts, vol. 50, column 8648d, but the yield is very low, for example, only about 4 percent.

It now has been found that the reaction of a 1-alkene, $(HCHO)_n$ wherein $n$ is the integer 1 or greater, a hydrogen halide and an acid halide at a temperature in the range of −80 to −30° C. produces relatively large yields of the 3-haloalkyl hydrocarboncarboxylate. In addition, this reaction results in substantial yields of 4-halotetrahydropyran. For example, a 3-chlorobutyl acetate yield of 34 mol percent and a 4-chlorotetrahydropyran yield of 35 mol percent were obtained in the example, based on the $(HCHO)_n$.

Accordingly, it is an object of this invention to provide an improved process for the production of 3-haloalkyl hydrocarboncarboxylates and 4-halotetrahydropyrans.

Other objects, aspects and advantages of this invention will become apparent to one skilled in the art upon consideration of the following disclosure and appended claims.

The conversion of this invention can be represented as follows:

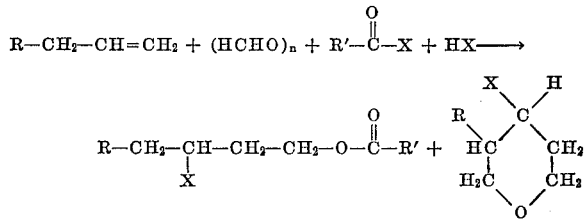

wherein $n$ is as previously defined; wherein R is hydrogen or alkyl, cycloalkyl, or combinations thereof such as cycloalkylalkyl or alkylcycloalkyl having 1 to 10 carbon atoms per R group; wherein R′ is alkyl or cycloalkyl having 1 to 6 carbon atoms per R′ group, and wherein X is a halogen such as chlorine, fluorine, bromine or iodine.

Specific examples of $(HCHO)_n$ are formaldehyde, paraformaldehyde, trioxane, or the like, preferably paraformaldehyde.

Specific examples of the hydrogen halides that can be employed in this invention are hydrogen chloride, hydrogen fluoride, hydrogen iodide and hydrogen bromide.

Specific examples of the acid halides that can be employed in this invention are acetyl chloride, heptanoyl bromide, cyclopentanecarbonyl iodide, cyclohexanecarbonyl fluoride, 1-(2-methylpentane)carbonyl chloride, and the like, and mixtures thereof.

Specific examples of the 1-alkenes that can be employed in the process of this invention are 1-tridecene, propene, 1-butene,
3-cyclopentylpropene,
3-cyclodecylpropene,
8-cyclopentyl-1-octene,
4-cyclononyl-1-butene,
4-cyclopentyl-1-butene,
3-(2-methylcyclopentyl)propane,
3-(4-methylcyclononyl)propene,
3-(2-pentylcyclopentyl)propene,
4-ethyl-5,5-dimethyl-1-octene, and the like, and mixtures thereof.

Specific examples of the 3-haloalkyl hydrocarboxylates that are produced by the process of this invention are 3-chlorobutyl acetate,
3-bromopentyl acetate,
3-fluorotetradecyl heptanoate,
6-ethyl-5,5-dimethyl-3-iododecyl cyclopentanecarboxylate,
4-cyclopentyl-3-iodobutyl cyclohexanecarboxylate,
3-chloro-4-cyclodecylbutyl 1-(2-methylpentane) carboxylate,
3-chloro-9-cyclopentylnonyl propanoate,
5-cyclononyl-3-fluoropentyl butanoate,
3-bromo-5-cyclopentyl hexanoate,
3-bromo-4-(2-methylcyclopentyl)butyl butanoate,
3-chloro-4-(4-methylcyclononyl)butyl acetate,
3-chloro-4-(2-pentylcyclopentyl)butyl acetate, and the like, and mixtures thereof.

Specific examples of 4-halotetrahydropyrans that are produced by the process of this invention are 4-chlorotetrahydropyran,
4-bromotetrahydropyran,
4-fluorotetrahydropyran,
4-iodotetrahydropyran,
4-chloro-3-cyclopentyltetrahydropyran,
4-bromo-3-cyclodecyltetrahydropyran,
4-iodo-3-methyltetrahydropyran,
4-bromo-3-decyltetrahydropyran,
4-bromo-3-(2-ethyl-4,4-dimethylhexyl)tetrahydropyran,
3-cyclopentylmethyl-4-fluorotetrahydropyran,
3-(5-cyclopentylpentyl)-4-fluorotetrahydropyran,
3-cyclononylmethyl-4-fluorotetrahydropyran,
4-chloro-3-(2-methylcyclopentyl)tetrahydropyran,
4-chloro-3-(4-methylcyclononyl)tetrahydropyran,
4-bromo-3-(2-pentylcyclopentyl)tetrahydropyran, and the like, and mixtures thereof.

Generally, the reaction temperature ranges from −80 to −30° C., preferably from −70 to −40° C. Reaction times sufficient to carry out the desired degree of conversion are employed. Generally, the reaction time ranges from 10 minutes to 48 hours. Pressures sufficient to maintain the reaction mixture substantially completely in the liquid phase are usually employed. Generally, this pressure ranges from 0.5 to 10 atmospheres. Atmospheric pressure is often employed because of convenience.

The mole ratio of $(HCHO)_n$ to 1-alkene generally ranges from 0.5:1 to 10:1. In the range of 0.5 to 10 moles of acid halide can be employed for each mole of 1-alkene. About 0.1 to 10 moles of hydrogen halide can be employed for each mole of 1-alkene.

A suitable diluent, if desired, can comprise as much as 95 weight percent of the liquid reaction mixture. Any diluent can be employed which is substantially completely non-reactive under the reaction conditions. Examples of suitable diluents include methylene chloride, chloroform, fluoroform, fluorotrichloromethane, carbon tetrachloride, tetrahydropyran, tetrahydrofuran, hexane, cyclohexane, diethyl ether, and the like, and mixtures thereof.

The 3-haloalkyl hydrocarboncarboxylates which are produced by the process of this invention are useful compounds. These compounds are disclosed by U.S. Pat. 2,607,800 to be useful as solvents, resin or rubber plasticizers, and chemical intermediates. The 4-halotetrahydropyrans which are produced according to the process of this invention also are useful compositions. For example, they can be employed as solvents or converted to 4-aminotetrahydropyrans. The 4 - halotetrahydropyrans of this invention also can be converted to 4-piperidinotetrahydropyrans or 4-morpholinotetrahydropyrans, converted to tetrahydropyrans or employed as extrusion aids for poly(vinyl fluoride). These 4-halotetrahydropyrans further can be converted to 3,6-dihydro-2[H]-pyrans by thermal dehydrohalogenation according to the process of copending application Ser. No. 678,519, filed on Oct. 27, 1967, now U.S. Pat. No. 3,527,771.

The advantages of this invention are further illustrated by the following example. The reactants and proportions and other specific conditions are presented as being typical and should not be construed to limit the invention unduly.

EXAMPLE I

A reactor was charged with 300 ml. of methylene chloride and 62 g. of paraformaldehyde. The flask was cooled to −65° C. and 125 g. of propylene was condensed into the flask followed by 157 g. of acetyl chloride. Then, hydrogen chloride was passed into the flask for 2.5 hours at −65° C. and the reaction mixture was allowed to warm to room temperature. The reaction mixture was washed with water, washed with saturated sodium carbonate solution, dried with magnesium sulfate and filtered. Then the solvent was removed and the residue was distilled. Gas-liquid chromatographic analysis of the final product showed a 34 mole percent yield of 3-chlorobutyl acetate based on the paraformaldehyde charged and a 35 mole percent yield of 4-chlorotetrahydropyran based on the paraformaldehyde charged.

This run clearly demonstrates that substantial amounts of 3-haloalkyl hydrocarboncarboxylate and 4-halotetrahydropyran are produced by the process of this invention.

Although this invention has been described in considerable detail, it must be understood that such details is for the purpose of illustration only and that many variations and modifications can be made by one skilled in the art without departing from the scope and spirit thereof.

I claim:

1. A process for the production of a 3-haloalkyl hydrocarbon carboxylate and a 4-halotetrahydropyran comprising reacting a 1-alkene represented by the formula $$R-CH-CH=CH_2$$

$(HCHO)_n$ wherein $n$ is the integer 1 or greater, a hydrogen halide and an acid halide represented by the formula

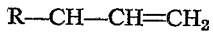

at a temperature in the range of −80° to 30° C., wherein R is hydrogen or alkyl, cycloalkyl or combinations thereof having from 1 to 10 carbon atoms per R group, R′ is alkyl or cycloalkyl having 1 to 6 carbon atoms per R′ group and X is chlorine, bromine, fluorine or iodine.

2. A process according to claim 1 wherein the mole ratio of $(HCHO)_n$ to 1-alkene is in the range of 0.5:1 to 10:1, the mole ratio of acid halide to 1-alkene is in the range of 0.5:1 to 10:1 and the mole ratio of hydrogen halide to 1-alkene is in th range of 0.1:1 to 10:1.

3. A process according to claim 1 wherein said reacting is carried out at a temperature in the range of −70° to −40° C., a time in the range of 10 minutes to 48 hours and a pressure in the range of 0.5 to 10 atmospheres.

4. A process according to claim 1 wherein said reacting is carried out in the presence of a substantially completely non-reactive diluent which can comprise up to 95 weight percent of the resulting reaction mixture.

5. A process according to claim 4 wherein said diluent is carbon tetrachloride.

6. A process according to claim 1 wherein $(HCHO)_n$ is formaldehyde, paraformaldehyde or trioxane, said 1-alkene is propylene, said hydrogen halide is hydrogen chloride and said acid halide is acetyl chloride.

7. A process according to claim 1 wherein $(HCHO)_n$ is paraformaldehyde.

8. A process according to claim 1 wherein said 3-haloalkyl hydrocarbon carboxylate is represented by the formula

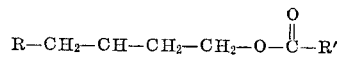

and said 4-halotetrahydropyran is represented by the formula

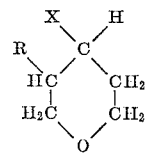

wherein R, R′ and X are as defined in claim 1.

9. A process according to claim 1 wherein said 3-haloalkyl hydrocarbon carboxylate is 3-chlorobutyl acetate and said 4-halotetrahydropyran is 4-chlorotetrahydropyran.

References Cited

UNITED STATES PATENTS 3,030,385  4/1962  Marcus et al. _____ 260—345.1
3,527,771  9/1970  Stapp _____ 260—345.1

JOHN M. FORD, Primary Examiner

U.S. Cl. X.R.

260—468 R, 468 P, 494

UNITED STATES PATENT OFFICE

CERTIFICATE OF CORRECTION

Patent No. 3,644,427        Paul R. Stapp        Dated: February 22, 1972

It is certified that error appears in the above-identified patent and that sai Letters Patent are hereby corrected as shown below:

Column 3, line 55, the formula which reads "R-CH-CH=CH$_2$" should read "R-CH$_2$-CH=CH$_2$"; column 4, line 10 "th" should read "the"; line 31, the formula "R-CH$_2$-CH-CH$_2$-CH$_2$-O-$\overset{\overset{O}{\|}}{C}$-R'" should read "R-CH$_2$-$\underset{X}{CH}$-CH$_2$-CH$_2$-O-$\overset{\overset{O}{\|}}{C}$-R'".

Signed and sealed this 18th day of July 1972.

(SEAL)
Attest:

EDWARD M. FLETCHER, JR.        ROBERT GOTTSCHALK
Attesting Officer        Commissioner of Patents